(12) United States Patent
Tanzi et al.

(10) Patent No.: US 8,270,831 B2
(45) Date of Patent: Sep. 18, 2012

(54) USE OF PRE-VALIDATED PATHS IN A WDM NETWORK

(75) Inventors: Alberto Tanzi, Trezzano sul Naviglio (IT); Maurizio Gazzola, Milan (IT); David Bianchi, Cambiago (IT)

(73) Assignee: Cisco Technology, Inc., San Jose, CA (US)

( * ) Notice: Subject to any disclaimer, the term of this patent is extended or adjusted under 35 U.S.C. 154(b) by 360 days.

(21) Appl. No.: 12/636,529

(22) Filed: Dec. 11, 2009

(65) Prior Publication Data

US 2011/0142450 A1  Jun. 16, 2011

(51) Int. Cl.
*H04J 14/02* (2006.01)

(52) U.S. Cl. .......................... 398/49; 398/68

(58) Field of Classification Search .............. 398/49–51, 398/68
See application file for complete search history.

(56) References Cited

U.S. PATENT DOCUMENTS

| 2002/1012634 | | 9/2002 | Fumagalli et al. | |
| 2003/0020982 | A1 | 1/2003 | Rychlicki | |
| 2005/0078659 | A1* | 4/2005 | Smith | 370/352 |
| 2007/0047465 | A1 | 3/2007 | Kano | |
| 2009/0034978 | A1 | 2/2009 | Gazzola et al. | |

OTHER PUBLICATIONS

"Fundamentals of DWDM Technology", Chapter-2, Introduction to DWDM for Metropolitan Networks, Cisco Systems, Inc, 2001, 22 pages.

Mannie, Eric, "Generalized Multi-Protocol Label Switching (GMPLS) Architecture", Network Working Group Internet Draft, Feb. 2001, 35 pages.

Ayyangar, Arthi, "RSVP-TE in GMPLS networks", Juniper Networks Inc., 2005, 57 pages.

"GMPLS—The New Big Deal in Intelligent Metro Optical Networking", White Paper, Polaris Networks Inc., 2003, 8 pages.

Kasahara, Teruo et al., "Design and Implementation of GMPLS-basd Optical Slot Switching Network with PLZT High-speed Optical Switch", 2007, 6 pages.

Asifyaseen, "Introduction to DWDM Technology", Fundamentals of DWDM Technology, 2007, 5 pages.

Palmieri, Francesco, "GMPLS Control Plane Services in the Next-Generation Optical Internet", The Internet Protocol Journal, vol. 11, No. 3, Sep. 2008, 48 pages.

Vinodkrishnan, Kulathumani et al., "Survivability in IP over WDM networks", Journal of High Speed Networks, vol. 10, 2001, 19 pages.

Kim, Jeong-Mi et al., "Control Mechanism for QoS Guaranteed Multicast Service in OVPN over IP/GMPLS over DWDM", Journal of Communications, vol. 2, No. 1, Jan. 2007, pp. 44-51.

Choudhary, Manish et al., "Analysis of Next Generation PON Architecture for Optical Broadband Access Networks", 2006, 8 pages.

(Continued)

*Primary Examiner* — Leslie Pascal

(57) ABSTRACT

Various example embodiments are disclosed. According to an example embodiment, a method may include receiving a resource request for optical resources within a wavelength division multiplexed (WDM) optical network; comparing one or more parameters of the resource request to a list of pre-validated paths for the WDM optical network, each pre-validated path identifying an optically feasible label switched path between a source node and a destination node; determining that there is a pre-validated path on the list that matches the one or more parameters of the optical resource request; and sending a message to request a reservation of resources along the matching pre-validated path.

22 Claims, 7 Drawing Sheets

OTHER PUBLICATIONS

Rouskas, George N., et al., "Optimal Granularity of MPLS Tunnels", In Proceedings of the 18th International Teletraffic Congress (ITC-18), 2003, 10 pages.

Ng, Noelle et al., "GMPLS In Optical Networks", Proceedings of the First Australian Undergraduate Students' Computing Conference, 2003, pp. 53-58.

Oki, Eiji et al., "Platform Technologies of IP Optical Traffic Engineering Server", NTT Technical Review, vol. 6, No. 5, May 2008, 6 pages.

Sivarajan, Kumar N., "Optical Networking Technology—An Introduction", Tejas Networks, 2000, 4 pages.

Otani, T. et al., "Interworking DWDM Equipment and PXC Operation using GMPLS for a Reliable Optical Network", PDP3, 2004, 3 pages.

"Cisco Segmented Generalized Multiprotocol Label Switching for the IP Next-Generation Network", 2006, 8 pages.

"Cisco ONS 15454 Multiservice Transport Platform", 2009, 23 pages.

PCT/US10/59922, "International Application Serial No. PCT/US10/59922, Search Report and Written Opinion mailed Apr. 4, 2011", 8 pages.

* cited by examiner

USE OF PRE-VALIDATED PATHS IN A WDM NETWORK

TECHNICAL FIELD

The present disclosure relates generally to optical networks.

BACKGROUND

Dense wavelength division multiplexed (DWDM) optical networks are optical networks in which optical signals at different wavelengths may be transmitted over a common or shared optical fiber. Each wavelength may be considered an optical channel. MPLS (MultiProtocol Label Switching) and GMPLS (Generalized MultiProtocol Label Switching) may be used to determine a path (or route) through a network, and then allocate resources for the path, in a distributed manner, such as through a distributed control plane. Electronic control plane technologies do not typically consider the optical impairments nor determine the optical feasibility of optical paths.

DESCRIPTION OF EXAMPLE EMBODIMENTS

Overview

According to an example embodiment, a method may include receiving a resource request for optical resources within a wavelength division multiplexed (WDM) optical network; comparing one or more parameters of the resource request to a list of pre-validated paths for the WDM optical network, each pre-validated path identifying an optically feasible label switched path between a source node and a destination node; determining that there is a pre-validated path on the list that matches the one or more parameters of the optical resource request; and sending a message to request a reservation of resources along the matching pre-validated path.

According to another example embodiment, an apparatus may include a processor, the processor being configured to cause the apparatus to: receive a resource request for optical resources within a wavelength division multiplexed (WDM) optical network; compare one or more parameters of the resource request to a list of pre-validated paths for the WDM optical network, each pre-validated path identifying an optically feasible label switched path between a source node and a destination node; determine that there is a pre-validated path on the list that matches the one or more parameters of the optical resource request; and send a message to request a reservation of resources along the matching pre-validated path.

According to another example embodiment, an apparatus may include means for receiving a resource request for optical resources within a wavelength division multiplexed (WDM) optical network; means for comparing one or more parameters of the resource request to a list of pre-validated paths for the WDM optical network, each pre-validated path identifying an optically feasible label switched path between a source node and a destination node; means for determining that there is a pre-validated path on the list that matches the one or more parameters of the optical resource request; and means for sending a message to request a reservation of resources along the matching pre-validated path.

Description

Figure 1:
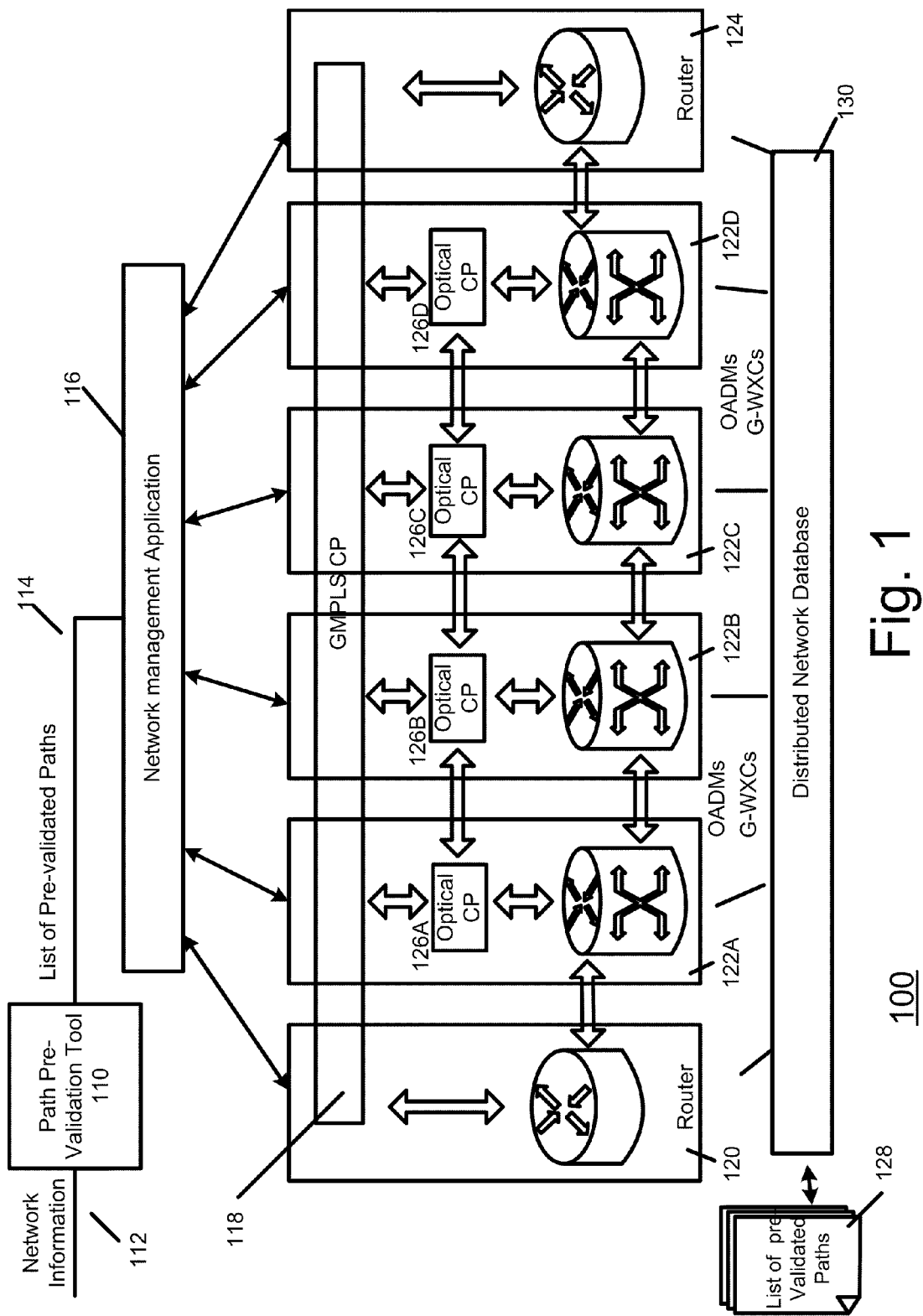
FIG. 1 is a block diagram illustrating a DWDM optical network according to an example embodiment.

FIG. 1 is a block diagram illustrating a WDM optical network 100 according to an example embodiment. The WDM optical network 100 may be, for example, a DWDM optical network. Optical network 100 may include a number of nodes including routers 120 and 124 that perform routing functions, e.g., routing packets or data to one of a plurality of output ports based on a routing algorithm. Optical network 100 may also include optical nodes 122, including optical nodes 122A, 122B, 122C, 122D. An optical fiber (or fibers) may be provided between each router and adjacent optical node 122, and between adjacent optical nodes 122. For example, there may be two fibers between adjacent nodes for bidirectional communication, e.g., a first optical fiber for transmitting optical signals from a node and a second fiber for receiving optical signals at the node. Optical nodes 122 may be, for example, Optical Add/Drop Multiplexers (OADMs) which may add optical signals, or may drop one or more optical signals before forwarding the optical signal via an optical fiber. The OADMs may be, for example, reconfigurable OADMS or ROADMs. Optical nodes 122 may provide entry (add) and exit (drop) points to the network. For example, for data transmitted from node 120 to 124, optical node 122A may be an entry point or ingress node, while optical node 122D may be an exit point or egress optical node, for example. This is merely an example network 100, and any number of routers, and optical nodes (e.g., OADMs) may be provided, and may be provided in a number of different configurations.

Each node may include an electronic control plane device, and these electronic control plane devices collectively may provide a GMPLS control plane (GMPLS CP) 118. The GMPLS CP 118, for example, may determine paths and may route messages, via GMPLS, through the network 100, but does not necessarily take into account any optical impairments along the path, such as optical impairments introduced by components along a potential path, such as noise, attenuation, etc. Each optical node 122 may include an optical control plane (OCP) control device 126. For example, optical nodes 122A, 122B, 122C and 122D may include OCP control devices 126A, 126B, 126C and 126D, respectively.

In an example embodiment, an ingress optical node, e.g., optical node 122A may receive a request for bandwidth across optical network 100, between a source node and a destination node. This may require the optical nodes to: determine a path; determine that the path is optically feasible; and, allocate or reserve resources along the path.

In one example embodiment, OCP control devices 126 may determine the optical feasibility of one or more paths through network 100, e.g., from a source node to a destination node, in response to the request for bandwidth. If feasibility is determined to be negative (path is not optically feasible), then the OCP control device may generate an error message that is sent to one or more other OCP control devices (including the OCP control device of the ingress optical node), and requests the electronic control plane to determine a new path (or new route between the source node and destination node). If the new path (new route between source node and destination node) is determined to be optically feasible, the optical nodes may then allocate or reserve resources for the path.

For example, one or more OCP control devices 126 may receive network information, which may be stored in a distributed network database 130, e.g., where a copy (full or partial copy) of the network information may be stored in memory at each optical node 122, for example. This network information may include a network configuration (or network topology) and optical parametric information for elements (e.g., optical splitters, OADMs, optical amplifiers, optical fibers) in the network 100, e.g. The optical parametric information may include any information that may describe operation of the elements, such as the increase or decrease in power (such as optical signal attenuation) introduced by an element, optical noise (e.g., how much noise an optical amplifier may introduce), a number of ports, the wavelengths that may be used or available, and the like. For example, optical parametric information may include an amount of signal attenuation or power loss due to an optical fiber, and the amount of insertion loss by an optical splitter or OADM, as examples.

In an example embodiment, one or more OCP control devices 126 may determine the optical feasibility of an optical path, in response to a bandwidth request message, or a resource request. In this example, optical feasibility of a path is determined after a bandwidth request message or resource request has been received and the path determined. This may be referred to as a real-time, or on-the-fly optical feasibility calculation since the optical feasibility calculation may be performed after or in response to a bandwidth request message or resource request for a DWDM network.

In a simple example optical feasibility calculation, the path may be considered to be optically feasible if the power of the optical signal received at a destination node (or egress optical node of the WDM network) is greater than or equal to the receiver sensitivity (or minimum required power) of the destination node (or egress node). For example, an OCP control device (either by itself, or in a distributed manner), may subtract the cumulative power losses along the path (due to the various components along the path) from the initial transmitted optical signal power to obtain the received optical signal power at the destination node. If the received optical signal power is greater than a threshold (e.g., greater than or equal to receiver sensitivity at the destination node), then the path may be considered to be optically feasible. Otherwise, in this example, the path may be considered not to be optically feasible. This is a simple example, and other types of optical feasibility calculations may be performed.

Some paths (or routes) may be optically feasible only for certain optical wavelengths or channels. For example, a path for a first wavelength may be optically feasible, while the same path for a second (or different) wavelength may not be optically feasible due to different levels of performance by different wavelengths, at least in some cases. Other measurements or criteria may be used to determine optical feasibility, such as bit error rate at the receiving or destination node, etc.

As noted, one or more OCP control devices 126 may determine whether or not an optical path is feasible. If it is not optically feasible, an error message may be generated, and the GMPLS control plane 118 may then find or determine a new path (a new route between the source node and destination node). Although not shown in FIG. 1, each node or router may include a GMPLS control plane control device 118A, 118B, . . . . Again, the optical control plane may determine whether this path is optically feasible. Eventually, a path may be identified that is optically feasible, resources may be allocated or reserved for the path, and data may be transmitted across the optical network, pursuant to the request for resources/bandwidth. However, performing the feasibility calculations for a path, on the fly (or in response to the optical resource request), may be a time consuming process, and as a result, may introduce network delays or latency.

Therefore, according to an example embodiment, a path pre-validation tool 110 may pre-validate one or more paths, which may include confirming that a path is optically feasible. A list of pre-validated paths maybe provided via line 114 to a network management application 116. Network management application 116 may provide the list of pre-validated paths to each (or to one or more) of the optical nodes 122, e.g., via GMPLS CP 118. The list of pre-validated paths 128 may be stored in the distributed network database 130. For example, a copy of the list of pre-validated paths 128 may be stored in each (or at least one or more) of the optical nodes 122A, 122B, 122C, 122D, . . . . A copy of the pre-validated paths 128 may also be stored in each (or one or more) routers.

When a resource request is received at an optical node 122A, e.g., specifying an amount of resources (which may be specified as a bandwidth, data rate, optical class, quality of service, or similar parameter), a source (or source node) and a destination (or destination node), the optical node 122A may compare one or more parameters of the resource request to the list of pre-validated paths 128. For example, the receiving node may compare the data rate, source and destination of the resource request to the data rate (or corresponding optical class), source and destination nodes of each pre-validated path, to determine if there is a match. The resource (or bandwidth) request may specify the source and destination as addresses, such as, for example, IP (Internet Protocol) addresses, or other identifiers. Thus, in one example embodiment, the source and destination IP addresses for the resource request may be compared to source and destination IP addresses in the list of pre-validated paths 128. If there is a pre-validated path in the list 128 that matches (fulfills) the bandwidth request, then the receiving optical node 122A may skip the optical feasibility calculation, since this path has been pre-validated or pre-calculated, and thus, it is already known that the pre-validated path is optically feasible. The list of pre-validated paths 128 includes a list of paths, where optical feasibility calculations has been (previously) performed for each path to confirm that each path on list 128 is optically feasible. Therefore, there is no need to repeat the optical feasibility calculations in response to receiving the resource request. In this case, where a path in the list of pre-validated paths 128 matches (or fulfills) the resource request, the receiving optical node 122A may skip the optical feasibility calculations (since this path was previously determined as being optically feasible), and may send a message (e.g., via the GMPLS CP 118) to reserve resources along the pre-validated path, such as using RSVP or resource reservation protocol.

After the resources along the path have been reserved or allocated, the data service may be provided, e.g., data may be transmitted along the matching pre-validated path. In this manner, through the use of the list of pre-validated paths, circuit provisioning delay may be reduced because the optical feasibility calculations for each pre-validated path has been performed in advance (e.g., before receipt of a resource request) for each path on the list 128, and the feasibility calculations need not be repeated for such path. This may typically decrease the time needed to provision an optical circuit on the network and/or reduce usage of network resources, according to an example embodiment.

According to an example embodiment, each of the pre-validated paths (or pre-validated label switched paths) may be defined by the following (or by one or more of the following):

Source and destinations, e.g., source node and destination node (these may be the router that provides the request at the ingress side, and the router at the egress side), or this may be the ingress optical node that receives the request and the egress optical node (e.g., 122A and 122D in FIG. 1).

Explicit path route, e.g., the hop to hop route from source node to destination node; thus, two different paths may have the same source and destination nodes, but may have different routes therebetween.

The wavelength (or optical channel) or set of wavelengths that can be used or assigned to the path along the route; the wavelength may be constant along the path or route, or may change in some regenerating nodes.

Optical class: the optical class identifies characteristics of the optical path, such as, for example, bitrate or data rate, modulation scheme and/or coding rate, minimum OSNR (optical signal to noise ratio) target, maximum CD (chromatic dispersion) robustness, etc. These are merely some example characteristics that may be defined by an optical class, other characteristics or parameters may be included or defined as well.

In an example embodiment, path pre-validation tool 110 may receive network information via line 112. Network information may include, for example (but not limited to): information describing a topology of the network (or network configuration), and optical parametric information for elements or components in the network. The optical parametric information may be provided for elements or components in the network, such as for, e.g., optical splitters, OADMs, optical amplifiers, optical fibers, and other components in the network 100. The optical parametric information may include any information that may describe elements or the operation of the elements, such as the increase or decrease in power (such as optical signal attenuation) introduced by an element, optical noise introduced by an optical amplifier, a number of ports for an optical node, the wavelength(s) that may be used or available, receiver sensitivity (or minimum required optical power for a received signal), and the like. For example, optical parametric information may include an amount of signal attenuation or power loss due to an optical fiber, and the amount of insertion loss (power loss) by an optical splitter or OADM, as examples.

Path pre-validation tool 110 may pre-validate one or more paths based on the received network information. As noted, copies of the list of pre-validated paths 128 may be transmitted from the network management application 116 to each (or one or more) of the optical nodes and stored in the distributed network database 130, e.g., which may be a copy of the list of pre-validated paths stored in memory of each (or one or more) of the optical nodes.

Pre-validation may refer to the optical feasibility calculation for a path being performed in advance, e.g., before a resource request or bandwidth request is received and matched to such pre-validated path. Pre-validation may occur, for example, during the network design phase, or during network deployment, or after a network is complete or deployed. If a network is updated or changed, e.g., network elements are added, changed or removed or reconfigured, then paths may then be re-validated by the path pre-validation tool 110. In such case, an updated list of pre-validated paths may be transmitted from network management application 116 and stored in distributed network database 130 (e.g., replacing the now outdated or inaccurate list 128 of pre-validated paths that was previously stored in database 130).

In one example embodiment, network management application 116 may receive messages from optical nodes via GMPLS CP 118 that provide updates as to components in use and network topology of the network 100. For example, network management application 116 may receive message(s) indicating that a group of optical nodes have been added, or that an optical node has been removed or is non-operational (either temporarily or permanently), or that some other change has occurred to optical network 100. Based on the messages received indicating such change, network management application 116 may send a message to path pre-validation tool 110 indicating that a change has occurred, and may identify details of the change. This message may cause path pre-validation tool 110 to obtain updated network information (if not already received), and re-validate one or more paths for network 100, and, then provide the updated list of pre-validated paths to network management application 116, which is then provided to database 130, for example.

Figure 2:
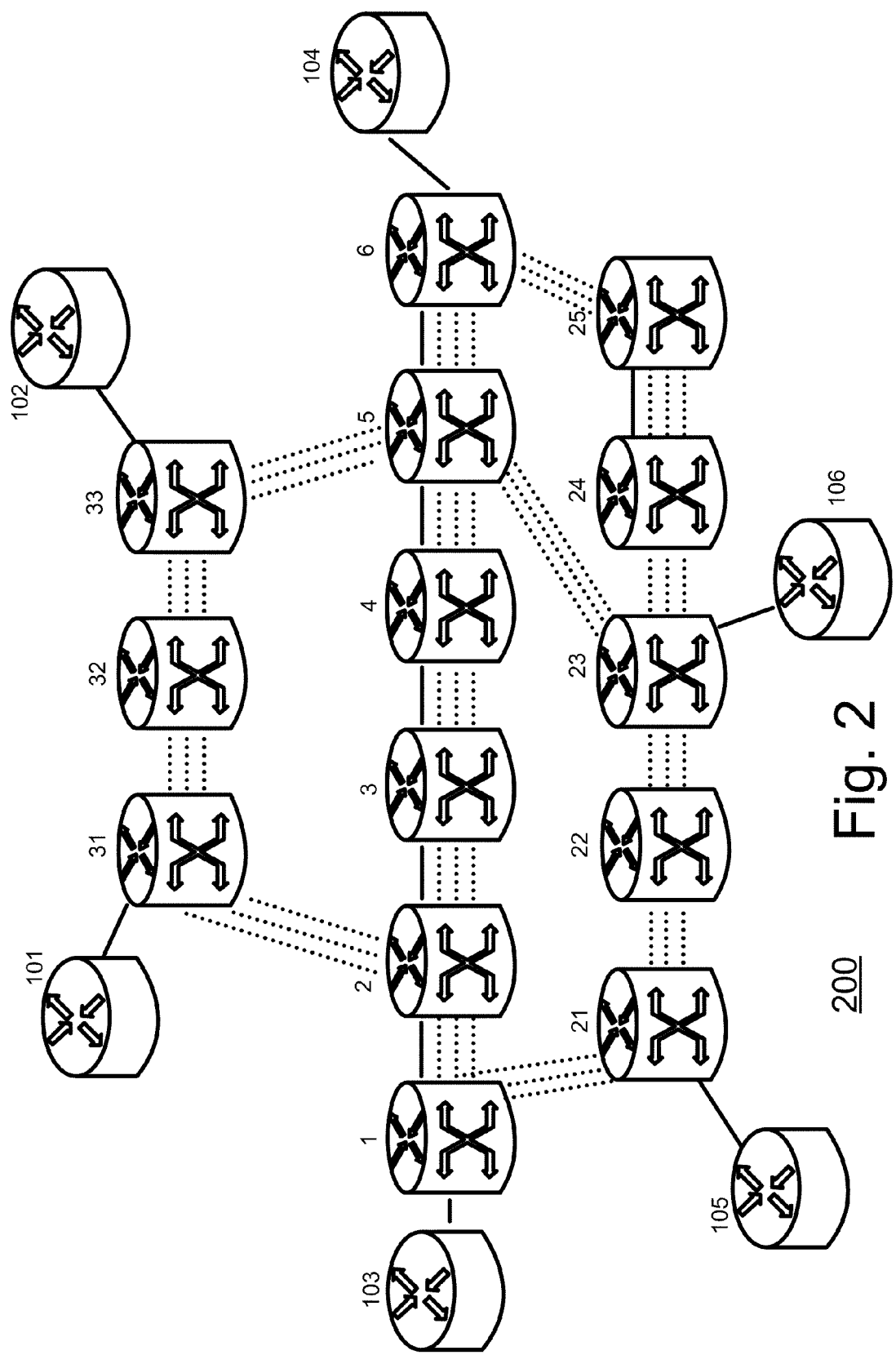
FIG. 2 is a diagram illustrating operation of an optical network according to an example embodiment.

FIG. 2 is a diagram illustrating operation of an optical network according to an example embodiment. The network 200 may include a number of routers, including routers 101, 102, 103, 104 and 105. Network 200 may also include a number of optical nodes (e.g., OADMs), such as optical nodes 1, 2, 3, 4, 5, 6, 21, 22, 23, 24, 25, 31, 32, and 33. The four parallel dashed lines connecting adjacent nodes represent four wavelengths (or optical channels) or lambdas, including: $\lambda 1$, $\lambda 2$, $\lambda 3$, $\lambda 4$. For simplicity, a number of elements or blocks shown in FIG. 1 may be present in FIG. 2, but are not shown, such as, e.g., path pre-validation tool 110, network management application 116, distributed network database 130, the electrical and optical control planes, etc.

In the example of FIG. 2, a list of pre-validated paths has been calculated by path pre-validation tool 110 and stored in distributed network database 130 (e.g., each node may include a copy of the list of the pre-validated paths 128).

In this example the list of pre-validated paths 128 stored in distributed network database 130 may include three paths or LSPs (label switched paths), including LSP1, LSP2 an LSP3, for example:

LSP1 (or Label Switched Path 1 or Path 1):

Source 1 (identifying optical node 1), Destination 6 (identifying optical node 6)

Route 1-2 (from optical node 1 to optical node 2), 2-3 (from optical node 2 to optical node 3), 3-4 (from optical node 3 to optical node 4), 4-5 (from optical node 4 to node 5), 5-6 (from node 5 to node 6). This identifies the hop-to-hop route for this path or LSP.

Wavelength=any $\lambda$ (this path may be used or implemented using any of the four wavelengths)

Optical Class=A (as noted above, the optical class may identify various characteristics of the optical path, such as, for example, data rate, modulation scheme and/or coding rate, minimum OSNR (optical signal to noise ratio) target, maximum CD (chromatic dispersion) robustness, etc., as examples. Thus, different optical classes may indicate different values for each of these characteristics or parameters.)

Reserved=NO (According to an example embodiment, the resources for this path have not been reserved, and thus, may be available for usage not only by LSP1 but also for any other LSP in the network, regardless whether pre-validated or not).

LSP2: Source 31, Destination 23
Route 31-2, 2-3, 3-4, 4-5, 5-23
Wavelength=λ2 (this path can be implemented only using λ2)
Optical Class=B
Reserved=YES (some resources for this path or LSP, such as λ2 on the selected route, are reserved and not available for other LSPs).

LSP3: Source 33, Destination 21
Route 33-5, 5-4, 4-3, 3-2, 2-1,1-21
Wavelength=λ3 or λ4 (this path can be implemented or used using either of these wavelengths but not λ1 or λ2)
Optical Class=C
Reserved=NO (thus, the resources for this path may be available, and also for other LSPs)

In this example, a resource request (or bandwidth request) may be received at optical node 1 (e.g., from router 103). Router 103 may request data service from router 103 (source node) to router 104 (destination node), and a data rate or bandwidth for bandwidth X. This request from router 103 to router 104 may correspond to optical node 1 as the source node, and optical node 6 as the destination node within the optical network, and node 1 may determine that bandwidth X (requested by router 103) may correspond to optical interface of class A (Optical class A) within the optical network.

Ingress node 1, for example, may compare one or more parameters of the resource request to the pre-validated paths 128 stored in the distributed network database 130 to determine if there is a match (a pre-validated path that fulfills the requested resources). The resource request may identify the source (or source node) and the destination (or destination node) by a source address and a destination address (provided in the resource request), respectively. The source and destination addresses may be specified as Internet Protocol (IP) addresses, for example, or other types of addresses or node identifiers. The receiving node or ingress node or ingress router, may map the source and destination IP addresses to corresponding nodes (e.g., routers or other nodes) in the network having (or being assigned) the specified IP addresses, for example. For example, the ingress node 1 may determine a node 1 as the source node and node 6 as the destination node based on the source IP address and destination IP address of the received bandwidth request message. Also, if necessary, the ingress node may map a requested data rate or bandwidth to a corresponding optical class, e.g., in order to compare the resource request to the list of pre-validated paths 128. Thus, the ingress node may compare an optical class corresponding to the requested data rate or bandwidth to the optical classes of entries in the list of pre-validated paths 128, for example.

Thus, ingress node 1 may perform a comparison of the source (or source node), destination (or destination node) and requested data rate/bandwidth/optical class of the resource request to the same (or corresponding) parameters of each entry in the list of the pre-validated paths 128 stored locally (or in the distributed network database 130). For example, the source node 1, destination node 6, and data rate/optical class=A of the bandwidth request matches the same parameters of the pre-validated path LSP1, which may be listed in the list of pre-validated paths 128. (An optical class that meets or exceeds the data rate in the resource request would match/fulfill the resource request).

Next, the ingress optical node 1 may determine whether the resources for this matching pre-validated path LSP1 have been reserved or not. In this case, the list of pre-validated paths 128 indicates that the resources for LSP1 are not reserved (and thus may be available).

Next, the ingress node may send a message (e.g., RSVP Path message) to the next downstream node (node 2) requesting resources for the path LSP1, and identifying, e.g., the data rate (or similar bandwidth or quality of service, or optical class) and the wavelength. In this case, any of the four wavelengths (optical channels may be used for LSP1). Assuming requested resources (e.g., wavelength, and ingress/egress ports of the node 2) are available at node 2, node 2 may then forward the RSVP Path message onto the next downstream node, e.g., node 3. This process may be repeated until the RSVP Path message reaches the destination node (node 6). Node 6 may then reply with a RSVP Allocation or Reservation message indicating that requested optical resources have been allocated (e.g., ports of the node, and the wavelength have been allocated), which is forwarded to node 5 (the next upstream node); Node 5 then forward the RSVP Allocation/Reservation message to node 4, and etc., until the RSVP Reservation (or Allocation) message reaches node 1, which indicates the requested optical resources have been allocated or reserved from source to destination along the route indicated for LSP1 to provide the requested data service for LSP1. The reservation of resources along a path from node 1 to node 6 is indicated in FIG. 2 with a solid line from nodes 1 to 6, e.g., with the solid lines between each node indicating that the corresponding wavelengths has been reserved for use.

After a matching pre-validated path (LSP1 in this example of FIG. 2) has been identified from the list 128, and resources in the optical network have been reserved for this path, ingress node 1 may then receive data from router 103 and may begin transmitting the data over the LSP1 to node 6, using the pre-validated path LSP1 (e.g., via the reserved resources).

After the data has been transmitted, the path may be torn down by the ingress node 1 sending a tear down message across the path, from node 1 to node 6, which frees up (or makes available again) the reserved resources that were used for this LSP1.

Note that according to an example embodiment, in some cases, multiple implementations of a pre-validated path may be used at the same time. For example, if a pre-validated path indicates that multiple wavelengths may be used, then the pre-validated path may be used to transmit data on each of the indicated wavelengths. This may allow multiple versions of the pre-validated path to be implemented at the same time, each implementation of the path on a different optical channel or wavelength, for example. On the other hand, if a pre-validated path (such as LSP2 in the example of FIG. 2) indicates only one wavelength to be used for the path, then only one implementation of the pre-validated path may be done at a time. For example, in such case where a pre-validated path indicates only one wavelength/optical channel, once the indicated wavelength is in use, or has been reserved, then the LSP/path may not be used, since the LSP is limited to that one wavelength.

Referring to the optical network of FIG. 2 again, another bandwidth request may be received at node 1 from router 103. The bandwidth request may indicate data service from router 103 to router 102, with bandwidth Y (which may be greater than bandwidth X, for example). Ingress optical node 1 determines that this bandwidth request corresponds to a request for data service from optical node 1 to optical node 33, and for optical class B. In this example embodiment, the requested LSP (or path) is not on the list of pre-validated paths 128. Note that if a matching source node and destination node were in the list 128 from node 1 to node 33 (or from router 103 to router 102), but for optical class A, this path in list 128 would not match the bandwidth request since it would be validated for a different data rate/optical class (e.g., validated for optical class A, when optical class B is requested, where optical class B may correspond to a higher data rate, for example).

In this example, the requested LSP is not in the list of pre-validated paths 128. In such case, the ingress optical node may, on-the fly, use OSPF (open shortest path first routing algorithm) to determine a route from node 1 to node 33, e.g., via GMPLS CP 118. Once a route is determined, ingress node may use the optical control plane (OCP) to determine the optical feasibility of such path. If such path is feasible, then RSVP messages may be sent from node 1 to node 33 along the path to reserve the resources. Thus, to summarize this example:

1. the requested LSP is NOT present in the pre-validated LSP database
2. A new LSP is routed (e.g., via OSPF) and signalled (or resources reserved for the LSP, e.g., via RSVP) through the network and validate with OCP
3. New LSP is Reserved [λ3 on path 1-2, 2-3, 3-4, 4-5, 5-33]

Thus, it can be seen that in response to a bandwidth request, parameters of the bandwidth request may be compared to the list of pre-validated paths to determine if a match exists. If a match does exist, then resources may be reserved, and the pre-validated path may be used to transmit data, without performing optical feasibility calculations. If a match is not found in the list of pre-validated LSPs, then a new path is determined, e.g., using OSPF, feasibility calculations are performed (in response to the resource request) by the optical control plane in a distributed manner (and not using the pre-validated paths), and resources for the path may then be reserved.

Figure 3:
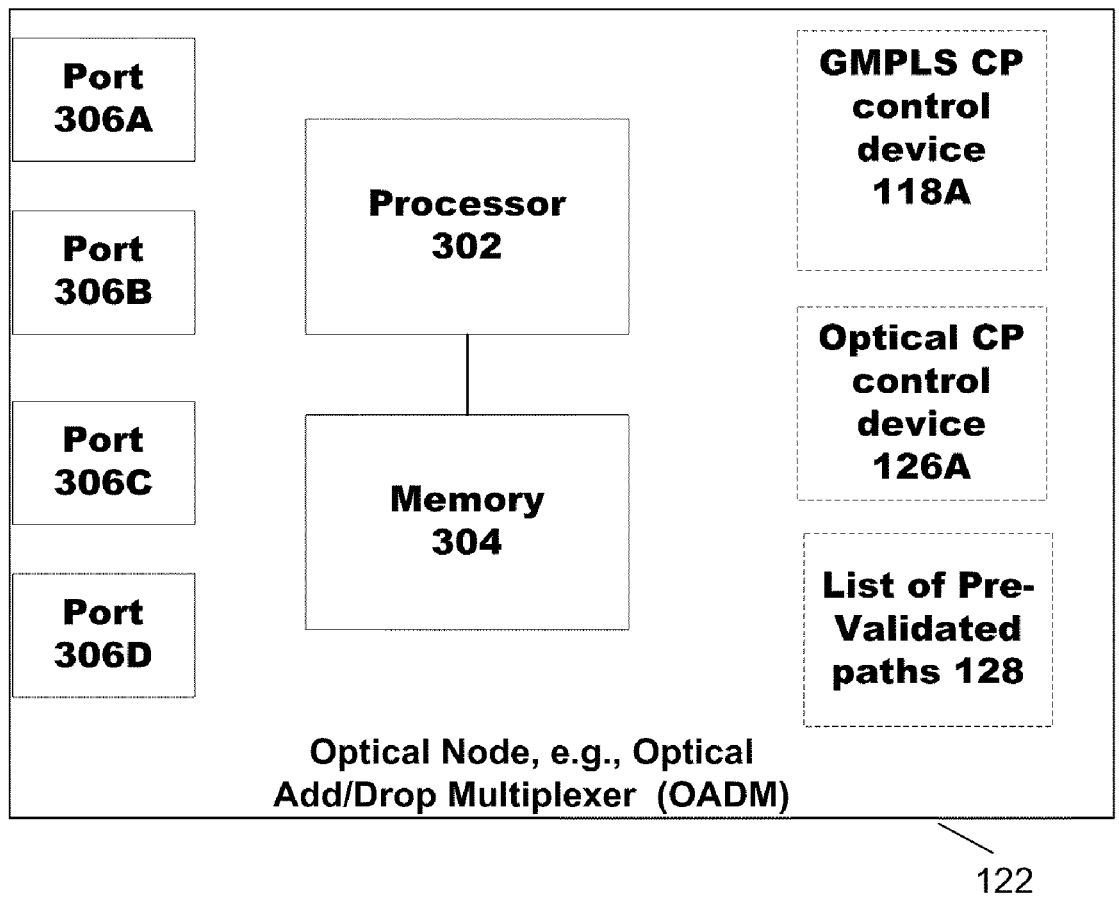
FIG. 3 is a block diagram of an optical node according to an example embodiment.

FIG. 3 is a block diagram of an optical node 122 according to an example embodiment. The optical node may be or may include, for example, an optical add/drop multiplexer (OADM). The optical node 122 may include a plurality of ports 306, such as ports 306A, 306B, 306C, 306D, etc. While only four ports are shown, any number of ports may be provided. Ports 306 may be, for example, optical ports that may provide an interface to an optical fiber, and each port may include an optical transmitter for transmitting signals over an optical fiber and an optical receiver for receiving optical signals over an optical fiber. Each (or one or more) optical nodes 122 may include a list of pre-validated paths 128, an optical control plane control device 126A, a GMPLS control plane control device 118A, which are described above. Optical node 122 may also include a processor 302 for executing code or instructions and providing overall control for node 122, and a memory 304 for storing information.

Figure 4:
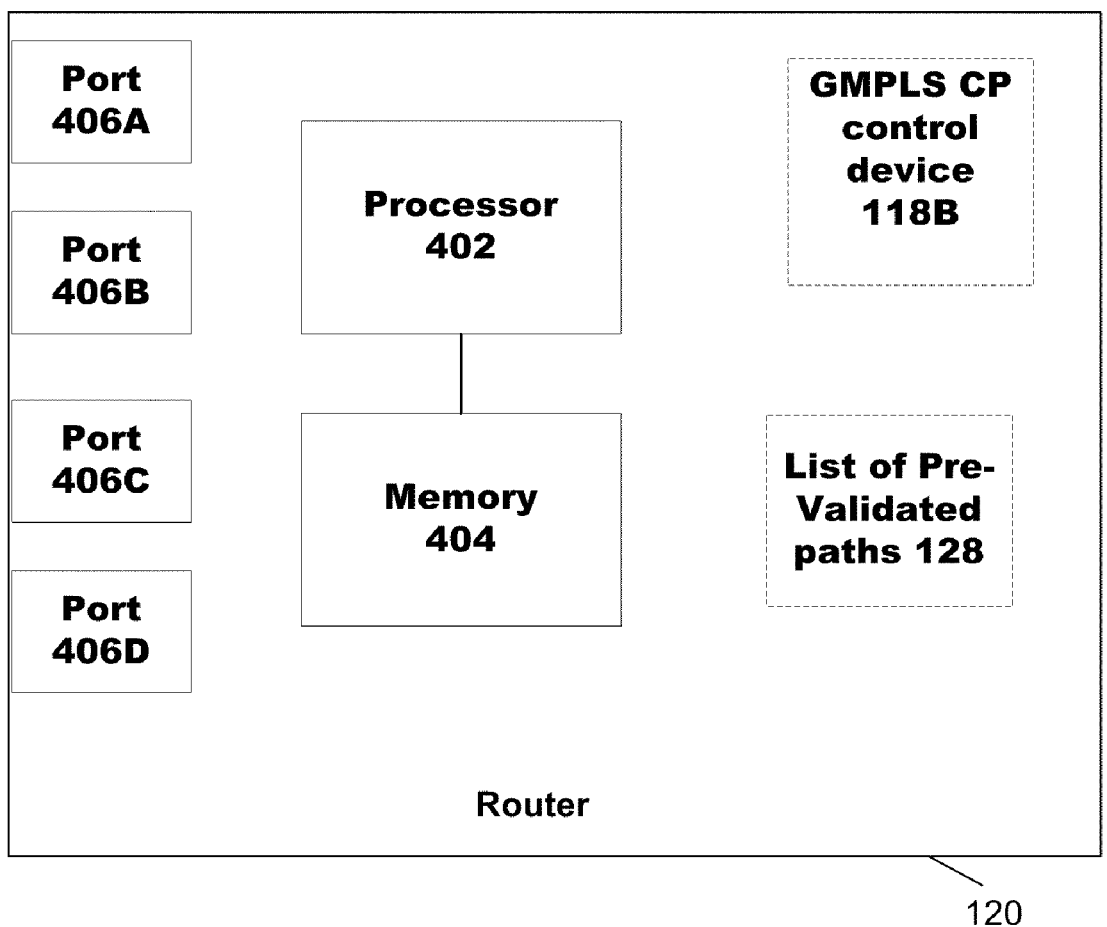
FIG. 4 is a block diagram of a router (or other network node) according to an example embodiment.

FIG. 4 is a block diagram of a router 120 (or other network node) according to an example embodiment. Router 120 may include one or more ports 406, such as ports 406A, 406B, 406C, 406D, etc. Any number of ports may be provided. Ports 406 may provide a network interface, such as an optical interface, and may include an optical transmitter for transmitting information over an optical fiber and an optical receiver for receiving information over an optical fiber, for example. Router 120 may include a list of pre-validated paths 128 and a GMPLS control plane control device 118B. Router 120 may also include a processor 402 for executing code or instructions and providing overall control for router 120, and a memory 404 for storing information.

In an example embodiment, either an optical node 122 (e.g., processor 302 of the optical node), such as an ingress optical node, or a router 120 or 124 (e.g., processor 402 of the router) may receive a resource request for optical resources, compare parameters of the resource request to a list of pre-validated paths 128, and determine if there is a match between the resource request and one of the paths on the list of pre-validated paths 128, and then send one or more messages along the matching pre-validated path to reserve resources along the matching pre-validated path (along the route for the matching pre-validated path).

In general, a label switched path (LSP) may be established for the pre-validated path to allow traffic for the data request or flow to be transmitted from source or ingress node to the destination node, e.g., from node 120 to node 124, via one or more intermediate optical nodes or OADMs. A label switched router (LSR), or a LSR capable optical node, may establish the LSP, e.g., using RSVP or GMPLS Path and/or RESV messages, for example. A label switched router or LSR (e.g., such as node 120, 124, as examples) may perform label switching by establishing a relation or association between a <input port, input label> and an <output port, output label>. Optical nodes, such as OADMs, may include an optical cross connect (OXC) for switching an optical data stream between an input port and an output port of the optical node, and for specific wavelengths or channels. Therefore, an optical node may perform switching by establishing a relation or association between an <input port, input optical channel/wavelength> and an <output port, output optical channel/wavelength>. Therefore, for optical nodes or OADMs, labels may be provided as an optical channel or optical wavelength, for example.

Figure 5:
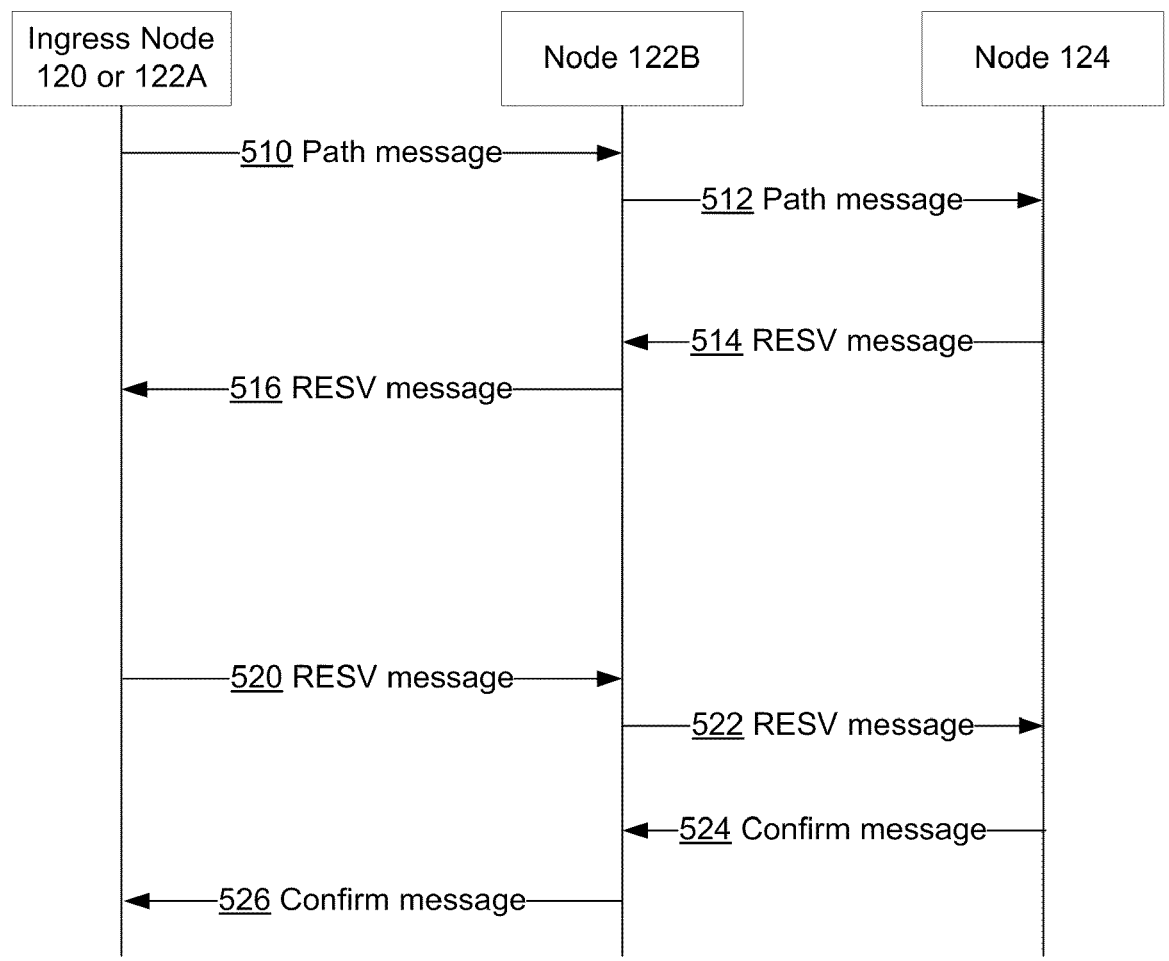
FIG. 5 is a diagram illustrating an example flow of messages that may be used to reserve resources along a pre-validated path according to an example embodiment.

FIG. 5 is a diagram illustrating an example flow of messages that may be used to reserve resources along a pre-validated path according to an example embodiment. A number of different messages or requests may be used, and the illustration in FIG. 5 shows some examples, and others may be used.

Ingress node 120 or 122A may send a RSVP (Resource Reservation Protocol) or GMPLS Path message 510 to a next (intermediate) node 122B or OADM along a matching pre-validated path, e.g., in order to request the reservation or allocation of resources to service this resource request. The packets or data associated with this resource request may be referred to as a flow, for example. The Path message 510 may include or identify a flow ID or a label, information describing the resource request (e.g., the wavelength(s) that are being requested or may be used, a bandwidth or data rate, etc.), and may include the explicit path (the hop to hop route for the matching pre-validated path) for which resources are being requested. Similarly, each intermediate node (only one intermediate node 122B is shown, but any number may be provided) forward the path message along the explicit path to the destination node 124. Therefore, node 122B may send a Path message 512 to destination node 124.

In an example embodiment, destination node 124 may send a reservation (RESV) message 514 to node 122B, for example. Node 122B, upon receipt of the reservation message 514, may assign resources for this flow (or LSP or resource request), including, e.g., input port and input wavelength/channel, and an output port and output wavelength/channel, and may create a binding or association between the input and output resources, e.g., create an association between the input port/input channel, and output port/output channel. Similarly, node 122B may send a RESV or reservation message (e.g., confirming that resources have been reserved or allocated to service the resource request or flow) to a next intermediate node (not shown). This RESV message may confirm that resources have been reserved, for example, and may identify the port and/or wavelength/channel to be used for that hop (e.g., which may be used by the OXC for optical switching).

Each intermediate optical node or OADM may similarly allocate resources (input port/input channel, output port/output channel), and create an association between the input and output resources. Finally, the reservation message 516 is received by the ingress node 120 or 122A, which indicates that resources have been reserved along the matching pre-validated path. The ingress node 120/122A may then begin transmitting data along the matching pre-validated path via the reserved resources.

Figure 6:
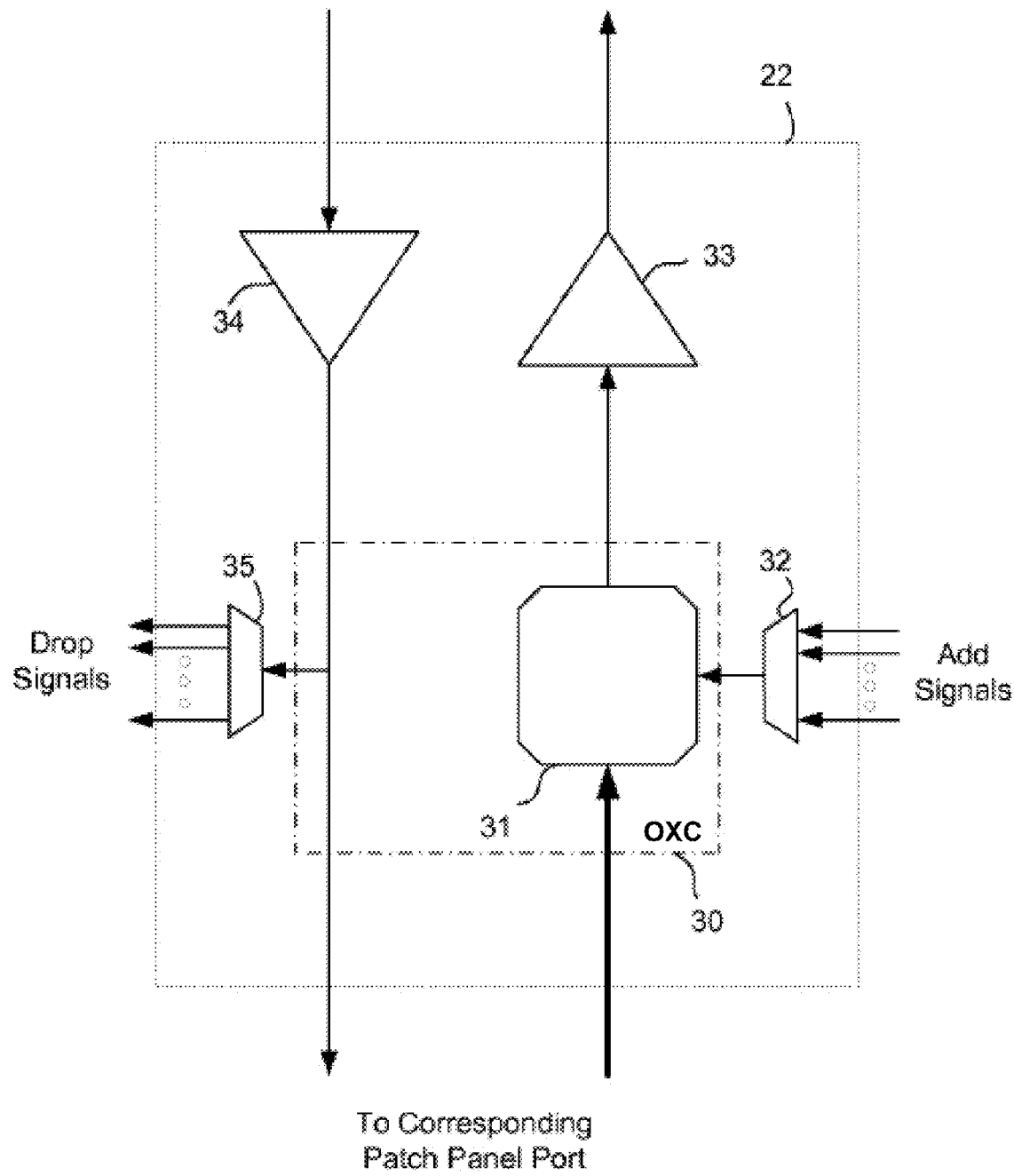
FIG. 6 is a block diagram illustrating a portion of an optical node, such as a portion of an OADM, according to an example embodiment.

According to another example embodiment, as shown in FIG. 5, ingress node 120 or 122A may send a reservation (RESV) message 520 requesting that resources be reserved for a flow or data request or LSP. The RESV message 520 may include, for example, include or identify a flow ID or a label, information describing the resource request (e.g., the wavelength(s) that are being requested or may be used, a bandwidth or data rate, etc.), and may include the explicit path (the hop to hop route for the matching pre-validated path) for which resources are being requested. The RESV message 522 is forwarded by node 122B and any intermediate nodes, to destination node 124. Each optical node or OADM may then reserve or allocate resources for this LSP, flow or data request, including <input port, input optical channel/wavelength> and an <output port, output optical channel/wavelength>. A confirmation message, indicating that resources have been reserved, may be forwarded as messages 524 and 526. FIG. 6 is a block diagram illustrating a portion of an optical add/drop multiplexer (OADM) according to an example embodiment. The OADM may include a block 22 that may include optical amplifiers 33 and 34, a multiplexer 32 receiving add signals, and a demultiplexer 35 outputting drop signals. The OADM may include an optical cross connect (OXC) 30, which may include a wavelength-selective switch 31. Wavelength selective switch 31 may be controlled by a processor, e.g., by processor 302 (FIG. 3) at an OADM to receive and select an optical signal for the pre-validated path on an input port and an input wavelength. The block 22 shown in FIG. 6 may be coupled to a patch panel (not shown). For example, the patch panel, as part of the OADM, may operate to switch signals between different ports of the OADM, e.g., under control of processor 302. Thus, the OADM, including the OXC 30 and patch panel, may switch the received optical signal from the input port and wavelength to an associated output port and output wavelength or channel. The input and output wavelengths/channels may be the same or may be different at an OADM. This is merely an example, and other examples or implementations of an optical node may be used. Some examples of an optical node are described in US Published application US2009/0034978, as an example.

Figure 7:
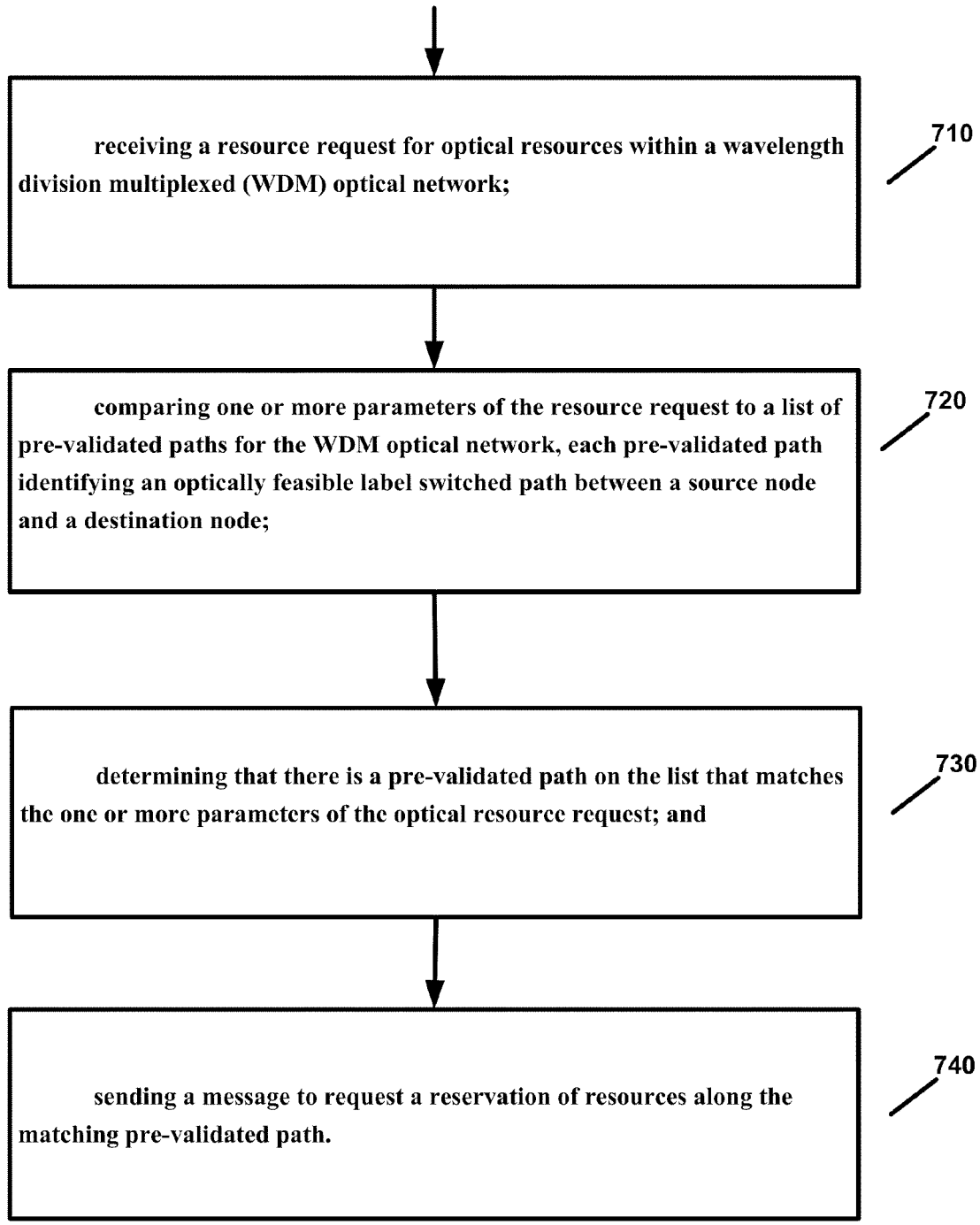
FIG. 7 is a flow chart illustrating operation of an optical network according to an example embodiment.

FIG. 7 is a flow chart illustrating operation of an optical network according to an example embodiment. Operation 710 may include receiving (e.g., via a port 306 and processor 302) a resource request for optical resources within a dense wavelength division multiplexed (DWDM) optical network. Operation 720 may include comparing (e.g., by processor 302) one or more parameters of the resource request to a list of pre-validated paths for the DWDM optical network, each pre-validated path identifying an optically feasible label switched path between a source node and a destination node. Operation 730 may include determining (e.g., by processor 302) that there is a pre-validated path on the list that matches the one or more parameters of the optical resource request. Operation 740 may include sending (e.g., via a port 306, GMPLS CP controller 118A, and processor 302) a message to request a reservation of resources along the matching pre-validated path. For example, operation 540 may include sending a message (e.g., RSVP Path message) to the next downstream node requesting (or reserving) resources for the matching pre-validated path. This message may be forwarded to additional nodes along the matching path (to reserve resources along the matching pre-validated path), and a reply or confirmation (confirming that resources for the matching path have been reserved) may be returned to the initiating or ingress node or ingress optical node. A number of alternative embodiments will be briefly described with reference to FIG. 7.

In an example embodiment, operation 710 may include receiving (e.g., via port 306 and processor 302) a resource request that requests optical resources between a source node and a destination node of a dense wavelength division multiplexed (DWDM) optical network, the resource request including a plurality of parameters including a source node, a destination node, and a resource amount.

In an example embodiment, the source node and the destination node may be identified by the resource request by Internet Protocol (IP) addresses, and wherein each of the pre-validated paths specifies a hop-to-hop route from a source node to a destination node.

In an example embodiment, the resource amount identifies a requested data rate or bandwidth. In another example embodiment, the resource amount identifies a requested optical class.

In another example embodiment, the resource request may identify at least a source node, a destination node and an amount of resources, wherein the comparing may include: comparing the amount of resources of the resource request to an amount of resources of each of one or more of the pre-validated paths to determine if any of the pre-validated paths would meet or exceed the amount of resources identified by the resource request; and comparing a source node and a destination node of the resource request to a source node and a destination node of each of one or more of the pre-validated paths to find a match.

In an example embodiment, operation 740 may include: determining (e.g., by processor 302) one or more optical wavelengths of the matching pre-validated path; and, sending (e.g., by processor 302, GMPLS CP control device 118A, and/or port 306) a message to request a reservation of resources along the matching pre-validated path, the message including at least the destination node, the amount of resources, and the one or more determined optical wavelengths, the resources to be reserved include one or more ports on each of one or more optical nodes along the matching pre-validated path and at least one of the determined optical wavelengths.

In an example embodiment, operation 740 may include: sending (e.g., by processor 302, GMPLS CP control device 118A, and/or port 306) a message to request a reservation of resources along the matching pre-validated path, without performing optical feasibility calculations for the matching pre-validated path based on the matching pre-validated path being previously determined as being optically feasible.

The flow chart of FIG. 7 may further include: receiving (e.g., by processor 302, GMPLS CP control device 118A, and/or port 306) a confirmation that resources along the matching pre-validated path have been reserved, the resources including at least a port on each of one or more optical nodes and an optical wavelength or optical channel for use in transmitting data; and, transmitting (e.g., by processor 302, and/or port 306) data along the matching pre-validated path using the reserved resources.

According to an example embodiment, an apparatus (e.g., optical node 122, or portion thereof) may include a processor (e.g., processor 302), the processor being configured to cause the apparatus to: receive a resource request for optical resources within a dense wavelength division multiplexed (DWDM) optical network; compare one or more parameters of the resource request to a list of pre-validated paths for the DWDM optical network, each pre-validated path identifying an optically feasible label switched path between a source node and a destination node; determine that there is a pre-validated path on the list that matches the one or more parameters of the optical resource request; and send a message to request a reservation of resources along the matching pre-validated path.

A number of alternatives of the apparatus will be briefly described. In an example embodiment, the processor being configured to cause the apparatus to receive may include the processor being configured to cause the apparatus to receive a resource request that requests optical resources between a source node and a destination node of a dense wavelength division multiplexed (DWDM) optical network, the resource request including a plurality of parameters including a source node, a destination node, and a resource amount.

In an example embodiment, the source node and the destination node may be identified by the resource request by Internet Protocol (IP) addresses, and wherein each of the pre-validated paths specifies a hop-to-hop route from a source node to a destination node.

In an example embodiment, the resource amount may identify a requested data rate, a bandwidth or a requested optical class.

In an example embodiment, the resource request may identify at least a source node, a destination node and an amount of resources, wherein the processor being configured to cause the apparatus to compare may include the processor (e.g., 302) being configured to cause the apparatus to: compare the amount of resources of the resource request to an amount of resources of each of one or more of the pre-validated paths to determine if any of the pre-validated paths would meet or exceed the amount of resources identified by the resource request; and compare a source node and a destination node of the resource request to a source node and a destination node of each of one or more of the pre-validated paths to find a match.

In an example embodiment, the processor being configured to cause the apparatus to send may include the processor being configured to cause the apparatus to: determine one or more optical wavelengths of the matching pre-validated path; and send a message to request a reservation of resources along the matching pre-validated path, the message including at least the destination node, the amount of resources, and the one or more determined optical wavelengths, the resources to be reserved include one or more ports on each of one or more optical nodes along the matching pre-validated path and at least one of the determined optical wavelengths.

In an example embodiment, the processor being configured to cause the apparatus to send may include the processor being configured to cause the apparatus to: send a message to request a reservation of resources along the matching pre-validated path, without performing optical feasibility calculations for the matching pre-validated path based on the matching pre-validated path being previously determined as being optically feasible.

In an example embodiment, the processor (e.g., 302) may be further configured to cause the apparatus to: receive a confirmation that resources along the matching pre-validated path have been reserved, the resources including at least a port on each of one or more optical nodes and an optical wavelength or optical channel for use in transmitting data; and transmit data along the matching pre-validated path using the reserved resources.

According to another example embodiment, an apparatus may include:

means for receiving (e.g., port 306 and/or processor 302) a resource request for optical resources within a dense wavelength division multiplexed (DWDM) optical network; means for comparing (e.g., processor 302) one or more parameters of the resource request to a list of pre-validated paths for the DWDM optical network, each pre-validated path identifying an optically feasible label switched path between a source node and a destination node; means for determining (e.g., processor 302) that there is a pre-validated path on the list that matches the one or more parameters of the optical resource request; and means for sending (e.g., by processor 302, GMPLS CP control device 118A, and/or port 306) a message to request a reservation of resources along the matching pre-validated path.

In an example embodiment, the means for sending may include:

means for sending (e.g., by processor 302, GMPLS CP control device 118A, and/or port 306) a message to request a reservation of resources along the matching pre-validated path, the message being sent without performing optical feasibility calculations for the matching pre-validated path based on the matching pre-validated path being previously determined as being optically feasible.

While certain features of the described implementations have been illustrated as described herein, many modifications, substitutions, changes and equivalents will now occur to those skilled in the art.

What is claimed is:

1. A method comprising:
   receiving a resource request for optical resources within a wavelength division multiplexed (WDM) optical network;
   comparing one or more parameters of the resource request to a list of pre-validated paths for the WDM optical network, each pre-validated path identifying an optically feasible label switched path between a source node and a destination node;
   determining that there is a pre-validated path on the list that matches the one or more parameters of the optical resource request; and
   sending a message to request a reservation of resources along the matching pre-validated path.

2. The method of claim 1, wherein the receiving comprises receiving a resource request that requests optical resources between a source node and a destination node of a wavelength division multiplexed (WDM) optical network, the resource request including a plurality of parameters including a source node, a destination node, and a resource amount.

3. The method of claim 2 wherein the source node and the destination node are identified by the resource request by Internet Protocol (IP) addresses, and wherein each of the pre-validated paths specifies a hop-to-hop route from a source node to a destination node.

4. The method of claim 2, wherein the resource amount identifies a requested data rate.

5. The method of claim 2, wherein the resource amount identifies a requested optical class.

6. The method of claim 1, where the resource request identifies at least a source node, a destination node and an amount of resources, wherein the comparing comprises:
   comparing the amount of resources of the resource request to an amount of resources of each of one or more of the pre-validated paths to determine if any of the pre-validated paths would meet or exceed the amount of resources identified by the resource request; and comparing a source node and a destination node of the resource request to a source node and a destination node of each of one or more of the pre-validated paths to find a match.

7. The method of claim 1, wherein the sending comprises:
determining one or more optical wavelengths of the matching pre-validated path;
sending a message to request a reservation of resources along the matching pre-validated path, the message including at least the destination node, the amount of resources, and the one or more determined optical wavelengths, the resources to be reserved include one or more ports on each of one or more optical nodes along the matching pre-validated path and at least one of the determined optical wavelengths.

8. The method of claim 1, wherein the sending comprises:
sending a message to request a reservation of resources along the matching pre-validated path, without performing optical feasibility calculations for the matching pre-validated path based on the matching pre-validated path being previously determined as being optically feasible.

9. The method of claim 1 and further comprising:
receiving a confirmation that resources along the matching pre-validated path have been reserved, the resources including at least a port on each of one or more optical nodes and an optical wavelength or optical channel for use in transmitting data;
transmitting data along the matching pre-validated path using the reserved resources.

10. The method according to claim 1, wherein the pre-validated paths are validated prior to receipt of the resource request.

11. An apparatus comprising a processor, the processor being configured to cause the apparatus to:
receive a resource request for optical resources within a wavelength division multiplexed (WDM) optical network;
compare one or more parameters of the resource request to a list of pre-validated paths for the WDM optical network, each pre-validated path identifying an optically feasible label switched path between a source node and a destination node;
determine that there is a pre-validated path on the list that matches the one or more parameters of the optical resource request; and
send a message to request a reservation of resources along the matching pre-validated path.

12. The apparatus of claim 11, wherein the processor being further configured to cause the apparatus to pre-validate the paths prior to receipt of the resource request.

13. The apparatus of claim 11, wherein the processor being configured to cause the apparatus to receive comprises the processor being configured to cause the apparatus to receive a resource request that requests optical resources between a source node and a destination node of a wavelength division multiplexed (WDM) optical network, the resource request including a plurality of parameters including a source node, a destination node, and a resource amount.

14. The apparatus of claim 13 wherein the source node and the destination node are identified by the resource request by Internet Protocol (IP) addresses, and wherein each of the pre-validated paths specifies a hop-to-hop route from a source node to a destination node.

15. The apparatus of claim 13, wherein the resource amount identifies a requested data rate.

16. The apparatus of claim 13, wherein the resource amount identifies a requested optical class.

17. The apparatus of claim 11, where the resource request identifies at least a source node, a destination node and an amount of resources, wherein the processor being configured to cause the apparatus to compare comprises the processor being configured to cause the apparatus to:
compare the amount of resources of the resource request to an amount of resources of each of one or more of the pre-validated paths to determine if any of the pre-validated paths would meet or exceed the amount of resources identified by the resource request; and
compare a source node and a destination node of the resource request to a source node and a destination node of each of one or more of the pre-validated paths to find a match.

18. The apparatus of claim 11, wherein the processor being configured to cause the apparatus to send comprises the processor being configured to cause the apparatus to:
determine one or more optical wavelengths of the matching pre-validated path; and
send a message to request a reservation of resources along the matching pre-validated path, the message including at least the destination node, the amount of resources, and the one or more determined optical wavelengths, the resources to be reserved include one or more ports on each of one or more optical nodes along the matching pre-validated path and at least one of the determined optical wavelengths.

19. The apparatus of claim 11, wherein the processor being configured to cause the apparatus to send comprises the processor being configured to cause the apparatus to:
send a message to request a reservation of resources along the matching pre-validated path, without performing optical feasibility calculations for the matching pre-validated path based on the matching pre-validated path being previously determined as being optically feasible.

20. The apparatus of claim 11, wherein the processor being further configured to cause the apparatus to:
receive a confirmation that resources along the matching pre-validated path have been reserved, the resources including at least a port on each of one or more optical nodes and an optical wavelength or optical channel for use in transmitting data; and
transmit data along the matching pre-validated path using the reserved resources.

21. An apparatus comprising:
means for receiving a resource request for optical resources within a wavelength division multiplexed (WDM) optical network;
means for comparing one or more parameters of the resource request to a list of pre-validated paths for the WDM optical network, each pre-validated path identifying an optically feasible label switched path between a source node and a destination node;
means for determining that there is a pre-validated path on the list that matches the one or more parameters of the optical resource request; and
means for sending a message to request a reservation of resources along the matching pre-validated path.

22. The apparatus of claim 21, wherein the means for sending comprises:
means for sending a message to request a reservation of resources along the matching pre-validated path, the message being sent without performing optical feasibility calculations for the matching pre-validated path based on the matching pre-validated path being previously determined as being optically feasible.

* * * * *